UNITED STATES PATENT OFFICE.

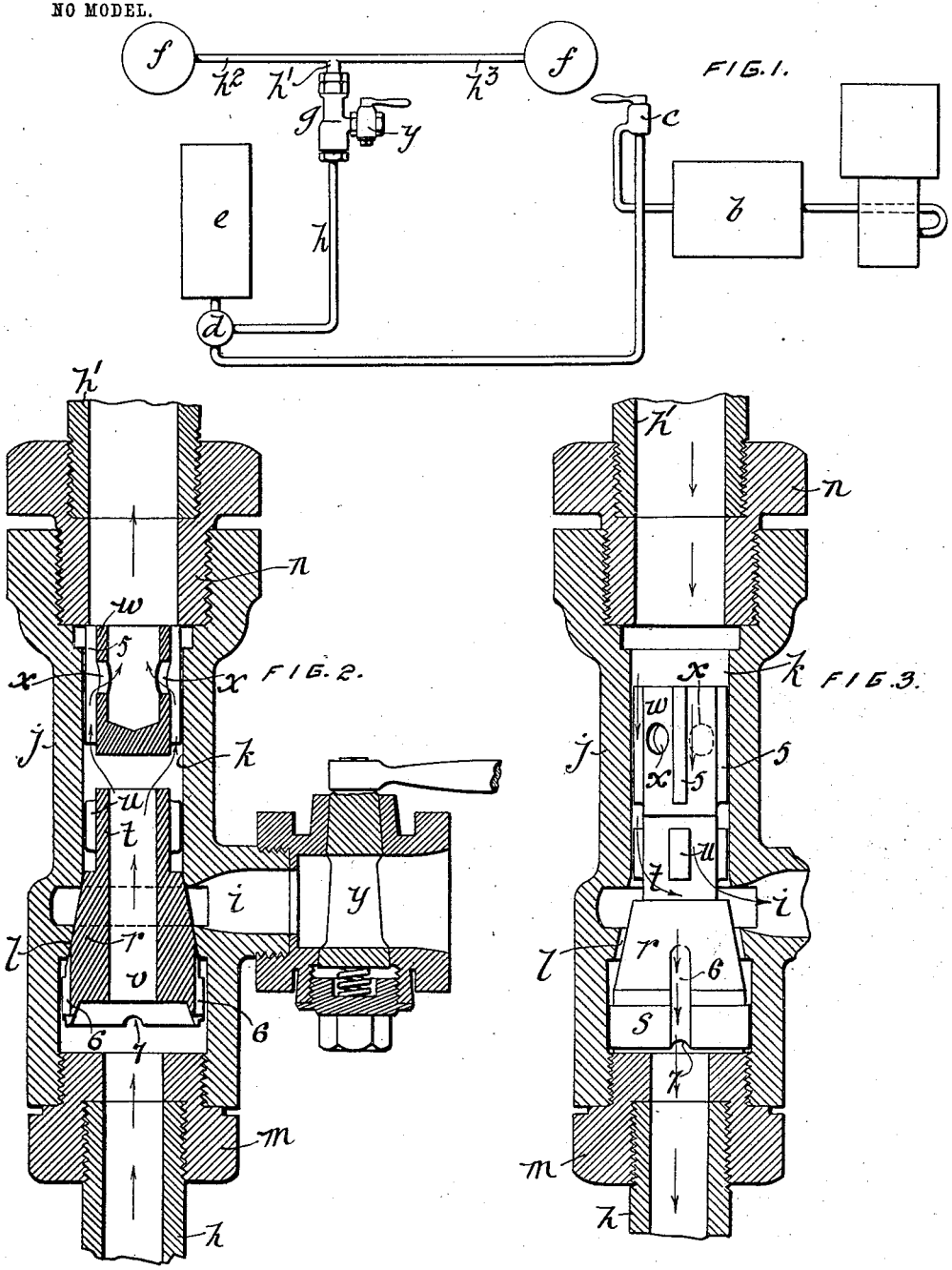

JOSEPH FARRAR, OF MONTREAL, CANADA.

AIR-BRAKE.

SPECIFICATION forming part of Letters Patent No. 722,403, dated March 10, 1903.

Application filed March 18, 1902. Serial No. 98,837. (No model.)

*To all whom it may concern:*

Be it known that I, JOSEPH FARRAR, of the city of Montreal, district of Montreal, and Province of Quebec, Canada, have invented certain new and useful Improvements in Air-Brakes; and I do hereby declare that the following is a full, clear, and exact description of the same.

My invention has for its object to provide a quick exhaust of the brake-cylinders, and it may be said, briefly, to consist in inserting a valve-carrying section presenting an uninterrupted passage with exhaust-outlet in the pipe leading to the brake-cylinder of the Westinghouse or other system and containing valve mechanism adapted to allow the flow of the air, as usual, the said brake-cylinder when the brakes are to be applied and to check the return flow and exhaust it direct to the atmosphere.

For full comprehension, however, of my invention reference must be had to the accompanying drawings, forming a part of this specification, in which like symbols indicate the same parts, and wherein—

Figure 1 is a diagrammatical view of an air-brake system provided with my invention. Fig. 2 is a detail longitudinal sectional view of the valve I prefer to use, and Fig. 3 is a similar view with the valves proper in elevation.

Referring to the diagrammatical view Fig. 1, the main reservoir is indicated at $b$. $c$ is the engineer's valve; $d$, the triple valve; $e$, the auxiliary reservoir; $f$, the brake-cylinders, and $g$ my improved valve-carrying section, located between the contiguous ends of the pipes $h$ and $h'$, (the latter with branches $h^2$ and $h^3$,) leading from the auxiliary reservoir to the brake-cylinders.

My improved valve-carrying section is illustrated particularly in Figs. 2 and 3, and consists of a valve-casing $j$, furnishing a chamber or passage of straight cylindrical form at one end, as at $k$, and of truncated conical form, as at $l$, at its other end, the truncated apex communicating with the straight cylindrical portion of the chamber, while about midway of the length of the conical portion is an exhaust branch $i$. A pair of automatically-coacting valves or valvular parts are located in this chamber, one of which is at times seated upon the conical portion thereof, while each when at their extreme positions away from one another are seated on the inner ends of headed bushings $m$ and $n$, respectively, threaded into the ends of the chamber, which are enlarged to accommodate them, while the pipes $h$ and $h'$ are threaded into the outer ends of said headed bushings. One of these valves or valvular parts consists of a conical middle portion $r$, with the ends $s$ at the base of the cone of straight cylindrical form and its opposite end $t$ diminished and provided with a series of external ribs $u$, adapted to slidably fit into the straight cylindrical portion of the valve-chamber, while a boring $v$ extends completely and axially through said valve. The other valvular part is of hollow cylindrical form $w$, perforated, as at $x$, and the end thereof contiguous to the valvular part just described closed, and a series of ribs $5$ extend longitudinally of the exterior thereof.

The operation of the system provided with my invention is as follows: The auxiliary reservoir $e$ is charged as usual, and when the pressure in the train-pipe is reduced to apply the brakes, as usual, the air flowing through the pipes $h$ and $h'$ from the auxiliary reservoir to the brake-cylinder acts upon the larger end of the conical valvular part and shifts it to its position in contact with the conical seat, thereby closing the exhaust $i$, while the cylindrical valvular part $w$ is simultaneously shifted away from the conical part into contact with the inner end of the bushing $n$. When the valves are in this position, there is a clear passage provided from the auxiliary reservoir through pipe $h$, the axial boring through the conical part, the valve-chamber, as indicated in Fig. 2, and the pipe $h'$, and branches $h^2$ and $h^3$ to the brake-cylinders $f$. The brakes are released (also as usual) by restoring the pressure in the train-pipe, which through the medium of the triple valve reduces the pressure in pipe $h$, and consequently the pressure on the base of the conical valvular part and causing the pressure in the brake-cylinders to shift the valvular part $w$ into contact with the diminished end of the conical part and moving the conical part away from its seat. When the valvular parts are in this position, there is a clear passage from the brake-cylinders through branches $h^2$ and $h^3$, pipe $h'$, the valve-chamber, and exhaust branch $i$ to the atmosphere, (see Fig. 3,) thus insuring a quick release of the brakes. In order to still further reduce the time consumed in releasing the brakes, I increase the capacity of the pipe $h'$ to equal that of the two branches $h^2$ and $h^3$, leading to the brake-cylinders, and construct the exhaust branch $i$ and the portion of the valve-cylinder therebetween and the pipe $h'$ of a proportionate size. This I can do, because the exhaust need not pass through and is therefore not obstructed, as heretofore, by the triple valve.

A stop-cock $y$ upon the exhaust branch $i$ enables the system to be changed, if desired, to have the exhaust flow, as formerly, through the triple valve to the atmosphere, to facilitate which the perimeter of the base of the conical valvular part is longitudinally grooved, as at 6, and the edge thereof is notched, as at 7, in line with said grooves, thus when the cock $y$ is closed allowing the air from the brake-cylinders to exhaust therethrough and through the triple valve, as formerly. If desired, a pipe can be coupled to the exhaust branch $i$ and taken to any desired point for convenience, where the stop-cock can be located.

What I claim is as follows:

1. In an air-brake comprising a brake-cylinder, an air-supply and an air-conductor leading from said air-supply to said brake-cylinder, the combination of a valve-carrying section forming a portion of the air-conductor and presenting an uninterrupted passage longitudinally thereof and a lateral outlet therefrom to the open air, and valve mechanism operating in said passage to control the escape of air from said brake-cylinder through said lateral outlet without at any time completely interrupting said longitudinal passage, substantially as described.

2. In an air-brake comprising a brake-cylinder, an air-supply and an air-conductor leading from said air-supply to said brake-cylinder, the combination of a valve-carrying section forming a portion of the air-conductor and presenting a continuous uninterrupted passage longitudinally thereof and a lateral outlet therefrom to the open air, a valve having an opening therethrough and movable longitudinally of said passage to control said outlet without at any time completely interrupting said longitudinal passage and a second valve also movable in said passage to control the opening through said first-mentioned valve, substantially as described.

3. In an air-brake comprising a brake-cylinder, an air-supply and an air-conductor leading from said air-supply and an air-conductor leading from said air-supply to said brake-cylinder, the combination with said air-conductor, of a valve-carrying section forming a portion of said conductor, said valve-carrying section having an uninterrupted main passage communicating at its ends with said air-supply and brake-cylinder respectively, an exhaust branch from said passage and means, including a cylindrical valve with opening therethrough, actuated by pressure toward the brake-cylinder to increase the capacity of said passage and close said exhaust branch, and upon the reversal of said pressure to open said exhaust without at any time completely interrupting said main passage, substantially as described and for the purpose set forth.

4. An air-brake comprising a pair of brake-cylinders an air-supply, a main air-conducting pipe leading from said air-supply and a pair of branches leading from said main pipe to said brake-cylinders, said main air-conducting pipe being of equal capacity to the collective capacities of said branches, a valve controlling said main pipe said valve consisting of a valve-casing having an exhaust-port of equal capacity to said main pipe, and means within said casing for at times closing said exhaust, for the purpose set forth.

5. In an air-brake comprising a brake-cylinder, an auxiliary cylinder, a triple valve, a pipe leading from said auxiliary cylinder to said triple valve, an air-conductor leading from said triple valve to said brake-cylinder, and an air-supply pipe leading to said triple valve, the combination with said air-conductor of a valve-carrying section located in same and having an uninterrupted main passage and an exhaust branch, a valve movable in said uninterrupted passage and controlling said exhaust branch without at any time completely interrupting said main passage said valve having an opening therethrough, and a second valve within said passage and controlling the opening through said first-mentioned valve, substantially as described and for the purpose set forth.

6. An air-brake valve comprising a valve-chamber having a conical valve-seat near one end thereof, an exhaust branch from said chamber adjacent to said valve-seat, and a valve-seat at each extremity of said valve-chamber, a valve proper located within said valve-chamber and slidable therein and having a conical portion to at times engage said conical valve-seat, said valve proper having a passage longitudinally therethrough, a second valvular portion located between the apex end of said valve proper and the adjacent end of the chamber, said second valvular part being of hollow cylindrical form blinded at one end and being of less length than the space between the said valve proper and the adjacent end of the chamber, a series of ribs longitudinally of the exterior of the apex end of the valve proper, and a series of ribs longitudinally of the exterior of said valvular part, substantially as described and for the purpose set forth.

7. An air-brake valve comprising a valve-chamber having a conical valve-seat near one end thereof, an exhaust branch from said chamber adjacent to said valve-seat, and a valve-seat at each extremity of said valve-chamber, a valve proper located within said valve-chamber and slidable therein and having a conical portion to at times engage said conical valve-seat, said valve proper having a passage longitudinally therethrough and longitudinal grooves in its perimeter, a second valvular portion located between the apex end of said valve proper and the adjacent end of the chamber, said second valvular part being of hollow cylindrical form blinded at one end and being of less length than the space between the said valve proper and the adjacent end of the chamber, a series of ribs longitudinally of the exterior of the apex end of the valve proper, and a series of ribs longitudinally of the exterior of said second valvular part, substantially as described and for the purpose set forth.

In testimony whereof I have affixed my signature in presence of two witnesses.

JOSEPH FARRAR.

Witnesses:
WILLIAM P. McFEAT,
FRED. J. SEARS.